(12) United States Patent
Gennasio

(10) Patent No.: US 6,905,146 B2
(45) Date of Patent: Jun. 14, 2005

(54) PIPE FITTING FOR INSIDE COATED PIPES AND METHOD FOR ITS INSTALLATION

(75) Inventor: Guido Gennasio, Vimercate (IT)

(73) Assignee: Aflagomma S.p.A., Vimercate (IT)

( * ) Notice: Subject to any disclaimer, the term of this patent is extended or adjusted under 35 U.S.C. 154(b) by 408 days.

(21) Appl. No.: 10/035,811

(22) Filed: Nov. 7, 2001

(65) Prior Publication Data

US 2002/0063424 A1 May 30, 2002

(30) Foreign Application Priority Data

Nov. 8, 2000 (IT) .......................................... MI00A2416

(51) Int. Cl.$^7$ ................................................. F16L 9/14
(52) U.S. Cl. ................ 285/256; 285/222.1; 29/890.144
(58) Field of Search ............................. 285/256, 222.1, 285/55; 29/890.144

(56) References Cited

U.S. PATENT DOCUMENTS

| 584,008 | A | * | 6/1897 | Munson ........................ 285/55 |
| 1,808,094 | A | * | 6/1931 | Yackey ......................... 285/55 |
| 2,046,114 | A | * | 6/1936 | Goodall ........................ 285/55 |
| 2,076,632 | A | * | 4/1937 | Goodall ........................ 285/55 |
| 2,184,116 | A | * | 12/1939 | Eastman .................... 285/256 |
| 4,293,150 | A | * | 10/1981 | Press ....................... 285/222.4 |
| 4,367,889 | A | * | 1/1983 | Redl ........................ 285/222.2 |
| 4,603,888 | A | * | 8/1986 | Goodall et al. ................ 285/55 |
| 4,635,972 | A | * | 1/1987 | Lyall ........................... 285/242 |
| 5,044,671 | A | * | 9/1991 | Chisnell et al. ............... 285/55 |
| 5,096,231 | A | * | 3/1992 | Chisnell et al. ............... 285/55 |
| 5,944,359 | A | * | 8/1999 | Andronaco .................... 285/55 |

* cited by examiner

Primary Examiner—Eric K. Nicholson
(74) Attorney, Agent, or Firm—Herbert Dubno

(57) ABSTRACT

A pipe fitting for pipes has a coating having a high mechanical and/or chemical resistance, a first tubular portion adapted to be connected to the pipe (2) and a second portion (8) adapted to connect with another pipe fitting. The first tubular portion has an inside coating made of a material having a high mechanical and/or chemical resistance. The pipe fittings are installed in a first step wherein an inside layer of the pipes, at one of their ends, is removed to obtain a housing, and a second step wherein the first tubular portion of the pipe fitting is introduced into the housing.

2 Claims, 3 Drawing Sheets

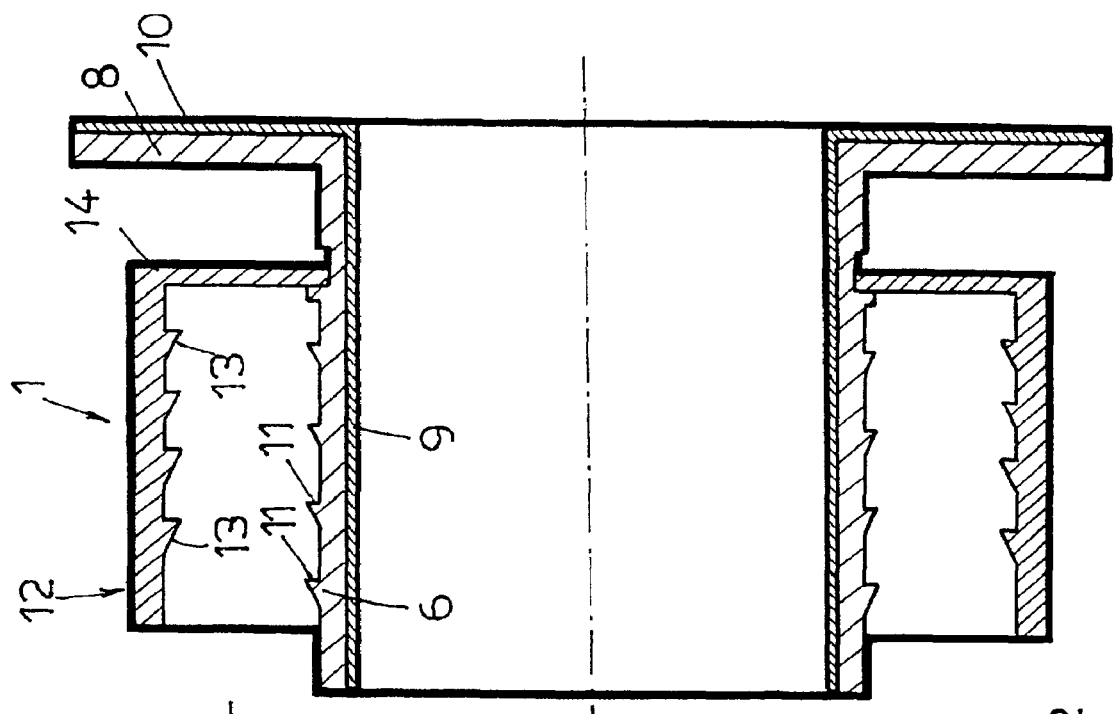
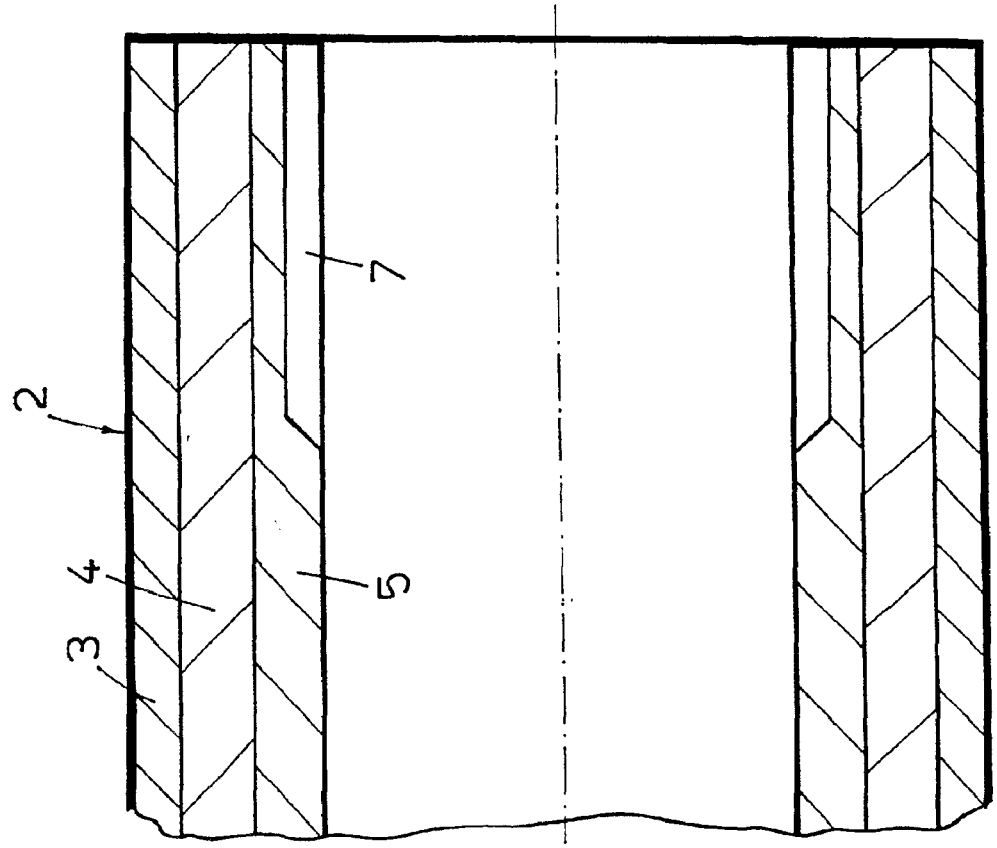
FIG. 2

PIPE FITTING FOR INSIDE COATED PIPES AND METHOD FOR ITS INSTALLATION

FIELD OF THE INVENTION

The present invention relates to a pipe fitting for internally coated pipes and to a method for its installation.

In particular, the present invention relates to pipe fittings for pipe chemical, acid, abrasive, wearing products, etc.

BACKGROUND OF THE INVENTION

The pipes of the above type currently comprise an inside layer made of rubber, plastic, thermoplastic rubber, or other material adapted to resist the product to be piped.

An intermediate stiffening layer is integral to it, and it is adapted to impart vacuum and/or pressure resistance to the pipe, realized through metal (wires, strings, strands) or textile (polyester, polyamide, aramide, rayon or other) plaits or spirals.

Finally, on the intermediate layer there is applied a covering layer adapted to protect the pipe from the action of external (atmospheric, chemical, mechanical wear, etc.) agents or effects, made of rubber, plastic, thermoplastic rubber, polyurethane, fabric, or other.

At the ends of the pipes there are applied pipe fittings allowing the connection of more pipes to one another.

In traditional embodiments, such fittings are made integral to the pipes during production, and they cannot be separated from the finished pipe; in practice, pipe fittings and pipes form a single piece.

However, traditional pipes cannot be produced in standard sizes to be stored and successively cut according to the buyers' requirements, since pipe fittings must in any case be applied to the ends of the pipes during production.

Thus, in practice, traditional pipes are produced on request, and they are sized according to the sizes required by the buyers.

OBJECTS OF THE INVENTION

Thus, an object of the present invention is that to eliminate the above technical disadvantages of the prior art with a pipe fitting for internally coated pipes which can be connected to an end of the finished pipe of the indicated type when the same pipe is installed, that is, even at the building yard.

Another object of the invention is to provide a pipe fitting which can allow producing standard length pipes which can be stored and successively cut according to the buyers' requirements.

Another object of the invention is to provide a pipe fitting which can guarantee a resistance to the piped product similar to that guaranteed by the pipes.

A further object of the invention is to provide a method of installing pipe fittings on the finished pipes in a simple and quick manner.

SUMMARY OF THE INVENTION

These objects and others according to the present invention, are achieved in a pipe fitting for pipes having a coating of a high mechanical and/or chemical resistance, comprising a first tubular portion adapted to be connected to said pipe, to which there is connected a second portion, adapted to the connection with another pipe fitting. At least the first tubular portion has an inside coating made of a material having a high mechanical and/or chemical resistance.

The pipe fittings according to the invention are suitably installed through a method for installing a pipe fitting for inside coated pipes, which comprises a first step wherein at least one inside layer of said pipes, at at least one of end of said pipe, is removed to obtain a housing, and a second step wherein a tubular portion of said pipe fitting is introduced into said housing.

According to the invention also the second portion can have a coating made of the material having a high mechanical and/or chemical resistance. The first tubular portion can have elements protruding from its outside surface, adapted to favor the connection of the pipe fitting to the pipe. These can include at least one clamping member of the first tubular portion to the pipe.

The clamping member can have a tubular body. The tubular body can be provided with inside protruding elements adapted to favor the connection of the clamping member to the pipe. The clamping member can have connection means to at least the first tubular portion of the pipe fitting.

The connection means can comprise an annular portion extending from the tubular body of the clamping member, the annular portion having a free edge inserted into a groove of the first tubular portion of the pipe fitting. At least the first tubular portion is inserted into a pipe which has an inside layer made of a material resistant to chemical and/or acid and/or abrasive and/or wearing products. The inside coating of the first tubular portion can be made of the same material as the inside layer of the pipe. The pipe fitting can comprise a sealing element at least between the first tubular portion of the pipe fitting and the inside layer of the pipe.

The method of installing a pipe fitting for pipes having a coating with a high mechanical and/or chemical resistance, can comprise a first step wherein at least one end portion of the inside layer of the pipes is removed so as to obtain a housing of a tubular portion of the pipe fitting, also exhibiting a high mechanical and/or chemical resistance, and a second step wherein the first tubular portion of the pipe fitting (1) is locked into the housing. A clamping member can be connected to at least the pipe.

BRIEF DESCRIPTION OF THE DRAWING

Further features and advantages of the invention will appear more clearly from the description of a preferred but not exclusive embodiment of the pipe fitting for inside coated pipes and of the method for its installation, according to the invention, illustrated by way of a non-limiting example in the attached drawing. In the drawings:

FIG. 2 shows a pipe fitting according to the invention in a step of assembly on a pipe;

SPECIFIC DESCRIPTION

Figure 1:
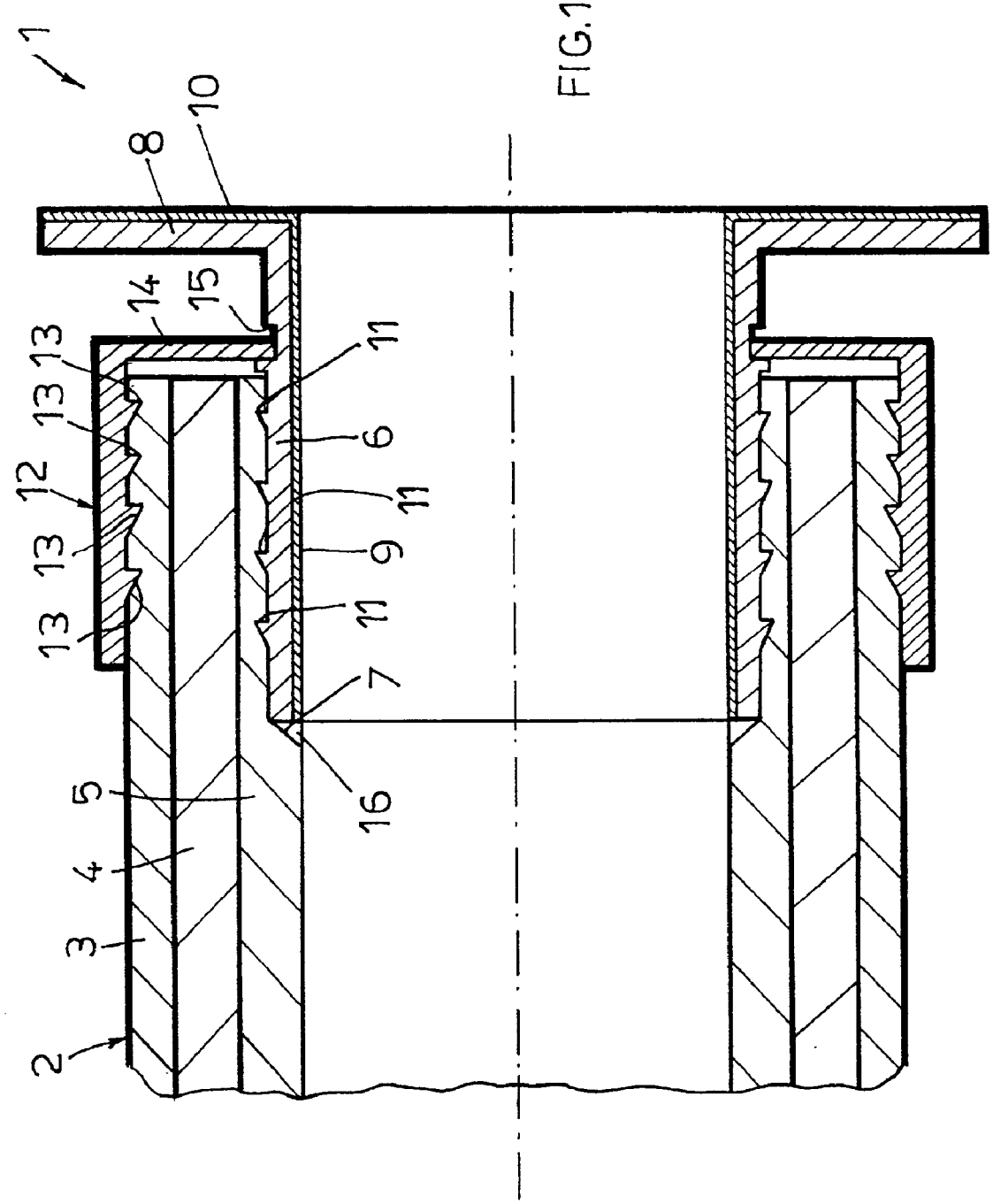
FIG. 1 shows a portion of a longitudinal section of a pipe fitting according to the invention, connected to an inside coated pipe, provided with a flanged connection portion.

With reference to the above figures, there is shown a pipe fitting for inside coated pipes, collectively indicated with reference numeral 1.

Pipe fitting 1 is adapted to connect to another pipe 2, of the type comprising an outside layer 3 made of rubber, plastic, thermoplastic rubber, surrounding a layer 4 made of textile (polyester, polyamide, aramide, rayon or other) or metal (wires, strings, strands) plaits or spirals.

In turn, layer 4 surrounds an inside or internal rubber layer 5.

The rubber of layer 5 is resistant to chemical attack, acid, abrasive and wearing products, and in general has a high mechanical and/or chemical resistance; the rubber of layer 3 is of the same type as the rubber of layer 5, even though in other embodiments it is of a different type.

Pipe fitting 1 comprises a first tubular portion 6, which is adapted to be fitted into a housing 7 inside pipe 2.

A second portion 8 protrudes from the first tubular portion 6, which is adapted to be connected to another portion 8 of another pipe fitting 1.

In the example shown, portion 8 consists of a flange provided with through holes (not shown) for inserting connection screws. However, in other embodiments, portion 8 is realized in a different manner.

Tubular portion 6 exhibits an inside coating 9 made of a material having a high mechanical and/or chemical resistance.

In a preferred embodiment, the material of coating 9 is the same as that of the inside layer 5 of pipes 2.

Moreover, in the example shown, also the second portion 8 exhibits a coating 10 made of the same material with high mechanical and/or chemical resistance as coating 9.

The first tubular portion 6 has a plurality of elements 11 protruding from its outside surface.

Elements 11 engage into layer 5 thus favoring the connection of pipe fitting 1 to pipe 2.

Moreover, pipe fitting 1 also comprises a member 12 clamping the tubular portion 6 of pipe fitting 1 to pipe 2.

The clamping member 12 exhibits a tubular body provided with inside protruding elements 13 which, by engaging in the coating layer 3, favor its connection to pipe 2.

Moreover, in a preferred embodiment, the clamping member 12 exhibits connection means to the first tubular portion 6. Such connection means comprises an annular portion 14 extending from the tubular body of member 12, and having a free edge inserted into a groove 15 of the tubular portion 6.

In a different embodiment, the clamping member 12 comprises clips or other devices.

Moreover, in housing 7, between the tubular portion 6 of pipe fitting 1 and the inside layer 5 of pipe 2, there is inserted a sealing element 16 which guarantees the continuity of the coating between the same pipe 2 and pipe fitting 1.

The sealing element 16 is realized, for example, through putty, self-vulcanizing rubbers, rubbers to be vulcanized or other dopes. note that in FIGS. 1 and 3–5, the inner surface of the coating 9, i.e. of the fitting 1 is flush with the inner surface of layer 5.

The pipe fitting for inside coated pipes is installed according to the following method.

Pipe 2 is first cut to size according to the needs.

Afterwards, a portion of the inside layer 5 of pipes 2 is removed at the end to which pipe fitting 1 must be connected, so as to obtain housing 7.

Such operation is carried out, for example, through rasping or some other known method. Note that, from FIGS. 1 and 3–5, it is clear that the portion of the layer 5 which remains after the formation of the housing 7 remains aligned with the remainder of that layer.

In a second step, the tubular portion 6 of pipe fitting 1 is inserted into housing 7 and it is locked therein, also thanks to elements 1 that engage into layer 5, or though chemical clamping by means of an adhesive, or in some other way.

In a third step, the clamping member 12 is inserted on the coating layer 3 of pipe 2.

In the example shown in the figures, the insertion of the clamping member 12 on pipe 2 is substantially concurrent to the insertion of portion 6 into the same pipe 2.

On the other hand, in the case of clamping members consisting of clips, the clips are applied after having introduced portion 6 of pipe fitting 1 into pipe 2.

The dope that realizes element 16 can be applied during the steps of assembly of the pipe fitting on the pipe.

Figure 3:
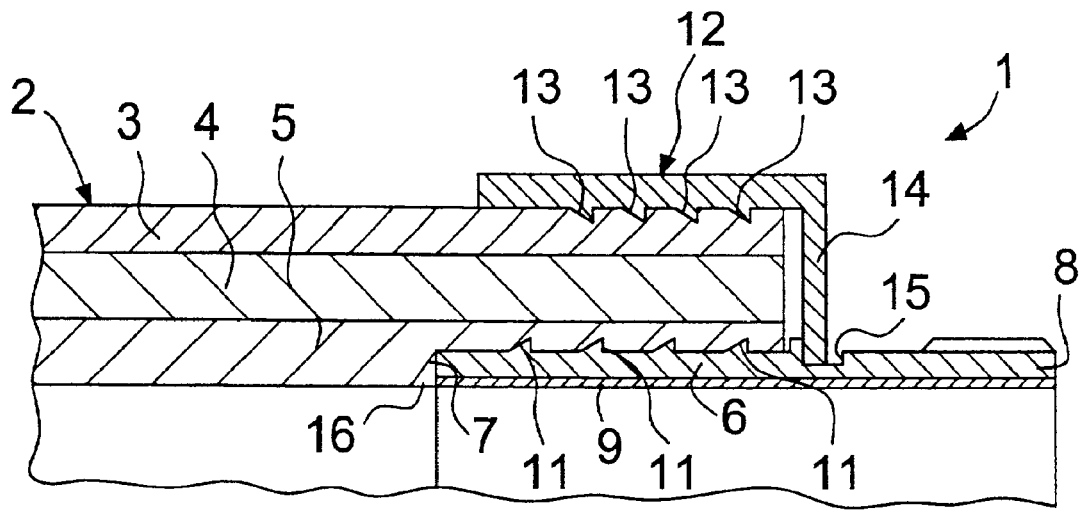
FIG. 3 shows a portion of a longitudinal section of the pipe fitting according to the invention connected to an inside coated pipe, provided with a threaded connection portion.
Figure 4:
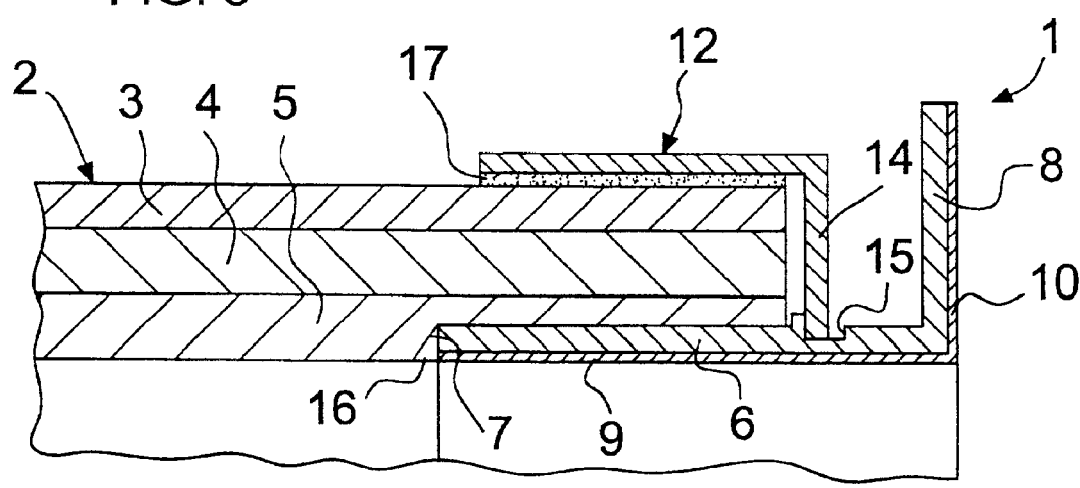
FIG. 4 shows a portion of a longitudinal section of a second embodiment of the pipe fitting according to the invention, connected to an inside coated pipe.
Figure 5:
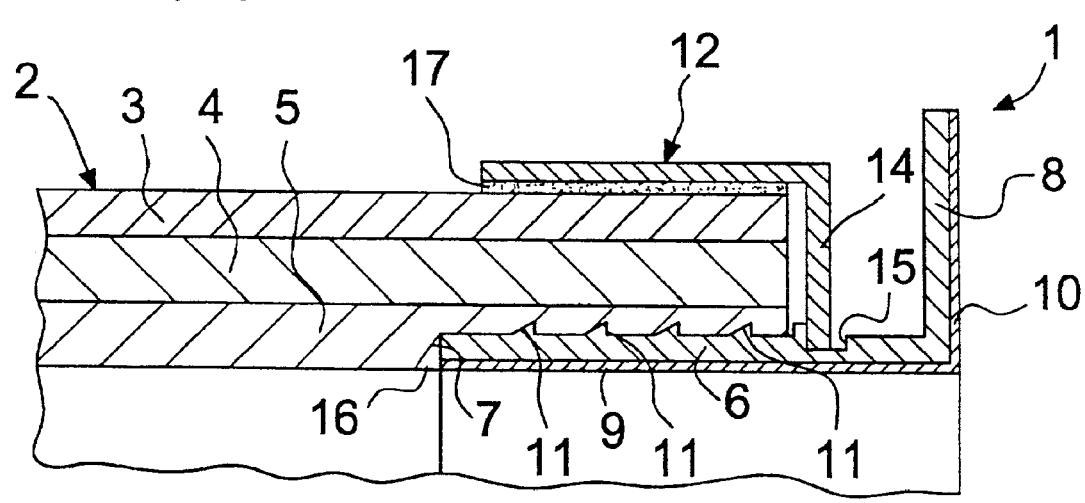
FIG. 5 shows a portion of a longitudinal section of a third embodiment of the pipe fitting according to the invention, connected to an inside coated pipe.

FIGS. 3 to 5 show further embodiment of pipe fitting 1 according to the invention, wherein equal reference numerals indicated equal or similar elements.

FIG. 3 shows a pipe fitting 1 where the second portion 8 is threaded.

In the example there is shown a male thread, but it is evident that pipe fitting 1 can have a female thread.

FIG. 4 shows another pipe fitting 1 wherein the connection between the clamping member 12 and layer 3 of pipe 2 is formed by an adhesive layer 17, whereas the connection between portion 6 and layer 5 of pipe 2 is formed by forcing the same portion 6 into housing 7, optionally by interposing an adhesive.

Such embodiment of pipe fitting 1 is adapted, for example, for low-pressure pipes.

FIG. 5 shows a further pipe fitting 1 wherein the connection between the clamping member 12 and layer 3 of pipe 2 is made through an adhesive layer 17, whereas the connection between portion 5 and layer 5 of pipe 2 is made through elements 11 protruding from the outside surface of the tubular portion 6.

In practice, it has been proved that the pipe fitting for inside coated pipes and the method for its installation according to the invention are particularly advantageous since they allow producing standard size pipes that can be stored and successively cut in any position. The pipe fittings according to the finding can be connected to the ends of such pipes in a simple and quick manner and moreover, the connection can also be carried out at the building yard.

The pipe fitting for inside coated pipes and the method for its installation thus conceived can be subject to several changes and variants, all falling within the scope of the inventive idea; moreover, all details can be replaced with technically equivalent elements.

In practice the materials used, as well as the sizes, can be of any type according to the requirements and to the prior art.

What is claimed is:

1. A method of making a pipe assembly which comprises the steps of:
   a. forming a pipe having an end and provided with an internal wear-resistant coating resistant to chemical attack and of uniform thickness over a length of said pipe;
   b. removing part of said internal coating to provide an annular recess at said end forming a housing while leaving a remainder of said internal coating around said recess continuing as an in-line prolongation of said internal coating to the end face of said pipe; and c. inserting a tubular first portion of a pipe fitting into said housing at said end and anchoring said tubular first portion therein, said tubular first portion being provided with an internal wear-resistant and chemical-attack-resistant coating so that an interior surface thereof is flush with an interior surface of the internal coating of the pipe adjacent said fitting, said fitting having a second portion external of said pipe and integral with said first portion for connection to another pipe fitting.

2. The method defined in claim 1, further comprising the steps of fitting a clamping member over said pipe around said tubular first portion.

* * * * *